United States Patent
Lingan et al.

(10) Patent No.: US 10,186,098 B2
(45) Date of Patent: Jan. 22, 2019

(54) ACCESS CONTROL VIA A MOBILE DEVICE

(71) Applicant: Honeywell International Inc., Morris Plains, NJ (US)

(72) Inventors: Magesh Lingan, Bangalore (IN); Anantha Padmanabha Rahal U, Bangalore (IN); Roshan Valder, Bangalore (IN); Bryan Jones, Muswellbrook (AU); Sanjay Roy, Plymouth, MN (US)

(73) Assignee: Honeywell International Inc.

( * ) Notice: Subject to any disclaimer, the term of this patent is extended or adjusted under 35 U.S.C. 154(b) by 30 days.

(21) Appl. No.: 15/356,329

(22) Filed: Nov. 18, 2016

(65) Prior Publication Data

US 2018/0144568 A1 May 24, 2018

(51) Int. Cl.
G07C 9/00 (2006.01)
H04B 1/3827 (2015.01)
H04W 4/029 (2018.01)
H04W 4/80 (2018.01)
H04W 4/02 (2018.01)
H04W 4/33 (2018.01)

(52) U.S. Cl.
CPC ......... *G07C 9/00309* (2013.01); *H04B 1/385* (2013.01); *H04W 4/023* (2013.01); *H04W 4/029* (2018.02); *H04W 4/33* (2018.02); *H04W 4/80* (2018.02); *G07C 9/00111* (2013.01); *G07C 9/00571* (2013.01); *G07C 2009/00769* (2013.01); *G07C 2209/63* (2013.01)

(58) Field of Classification Search
CPC .......................... G06K 7/10366; G06Q 10/08
USPC ........................................................ 340/5.6
See application file for complete search history.

(56) References Cited

U.S. PATENT DOCUMENTS

| 4,672,654 A | 6/1987 | Vanacore |
| 7,969,302 B2 | 6/2011 | Srinivasa et al. |
| 9,058,702 B2 | 6/2015 | Chao et al. |

(Continued)

FOREIGN PATENT DOCUMENTS

| CN | 104144497 A | 11/2014 |
| EP | 2085934 A1 | 8/2009 |

OTHER PUBLICATIONS

Fave, et al. "Game-theoretic Security Patrolling with Dynamic Execution Uncertainty and a Case Study on a Real Transit System", Journal of Artificial Intelligence Research 50, Jun. 2014, 47 pp.
Logosoft brings lone worker supervision into the Android era, http://www.securitynewsdesk.com/logosoft-brings-lone-worker-supervision-android-era/, May 29, 2014, 7 pp.

(Continued)

*Primary Examiner* — Vernal Brown
(74) *Attorney, Agent, or Firm* — Honeywell International Inc.

(57) ABSTRACT

Systems, devices, and methods for access control via a mobile device are described herein. One device includes instructions stored thereon executable by a processor to track a location of a mobile device in a facility based on communications between the mobile device and a plurality of beacons located in the facility, wherein the mobile device is associated with a particular user having access rights associated with the facility, determine that the mobile device is located in a particular area of the facility, determine whether the user is allowed access to the particular area based on the access rights, and provide a notification responsive to a determination that the user is not allowed access to the particular area.

18 Claims, 5 Drawing Sheets

(56) References Cited

U.S. PATENT DOCUMENTS

| | | | |
|---|---|---|---|
| 9,076,273 B2 | 7/2015 | Smith et al. | |
| 9,444,805 B1* | 9/2016 | Saylor | H04L 63/08 |
| 9,514,469 B2* | 12/2016 | Fuchs | G06Q 30/02 |
| 2005/0242957 A1* | 11/2005 | Lindsay | G06K 19/0716 340/572.7 |
| 2009/0249433 A1 | 10/2009 | Misra et al. | |
| 2010/0102993 A1* | 4/2010 | Johnson | G06Q 10/08 340/988 |
| 2011/0291798 A1 | 12/2011 | Schibuk | |
| 2013/0021145 A1* | 1/2013 | Boudy | G08B 13/1427 340/426.11 |
| 2013/0314210 A1* | 11/2013 | Schoner | G06K 7/10366 340/8.1 |
| 2014/0049361 A1 | 2/2014 | Ahearn et al. | |
| 2014/0342667 A1 | 11/2014 | Aarnio | |
| 2014/0375421 A1 | 12/2014 | Morrison et al. | |

OTHER PUBLICATIONS

Sookman "Smartphones are Key to the Future of Security", https://www.guardly.com/blog/2015/02/04/smartphones-are-key-to-the-future-of-security/index.html, Feb. 4, 2015, 5 pp.

Bobescu, et al., "Mobile indoor positioning using wi-ti localization", Review of the Air Force Academy, 2015, No. 1 (28), 4 pp.

Bhargava, et al., "Physical Authentication through Localization in Wireless Local Area Networks", Global Telecommunications Conference, GLOBECOM '05 IEEE, Jan. 23, 2006, 5 pp.

"Passive Entry Door System with Proximity Sensor", http://www.atmel.com/Images/Atmel-42582-Passive-Entry-Door-System-with-Proximity-Sensor_Application%20Note_AT12649.pdf, Nov. 2015, 22 pp.

Bellido-Outeirño, "Universal Bluetooth™ Access Control and Security System", International Journal on Advances in Security, 2011, vol. 4 No. 3 and 4, 10 pp.

\* cited by examiner

ACCESS CONTROL VIA A MOBILE DEVICE

TECHNICAL FIELD

The present disclosure relates to systems, devices, and methods for access control via a mobile device.

BACKGROUND

Access control systems are designed to provide access to areas of a facility for individuals who are authorized to access such areas, and deny access to those areas of the facility to individuals who are not authorized to access such areas. For example, certain individuals may be authorized to access a secure area of a facility, whereas other individuals may not be allowed to access the secure area.

Previous approaches to access control systems may use physical access cards. Carrying a physical access card may be cumbersome. A user may be locked out of an area if the user forgets to carry the physical access card, and an unauthorized user may gain access to a secure area because the access control system cannot verify the physical identity of the user carrying the physical access card.

Additionally, previous approaches may not link an access control system with a physical access card to track the card within the facility in that the physical access card may be disconnected from the system until the user manually displays the card to an access reader, for instance. Moreover, a person may not use the card (intentionally or unintentionally) and gain access to an area of a facility by following another person in.

DETAILED DESCRIPTION

Figure 1A:
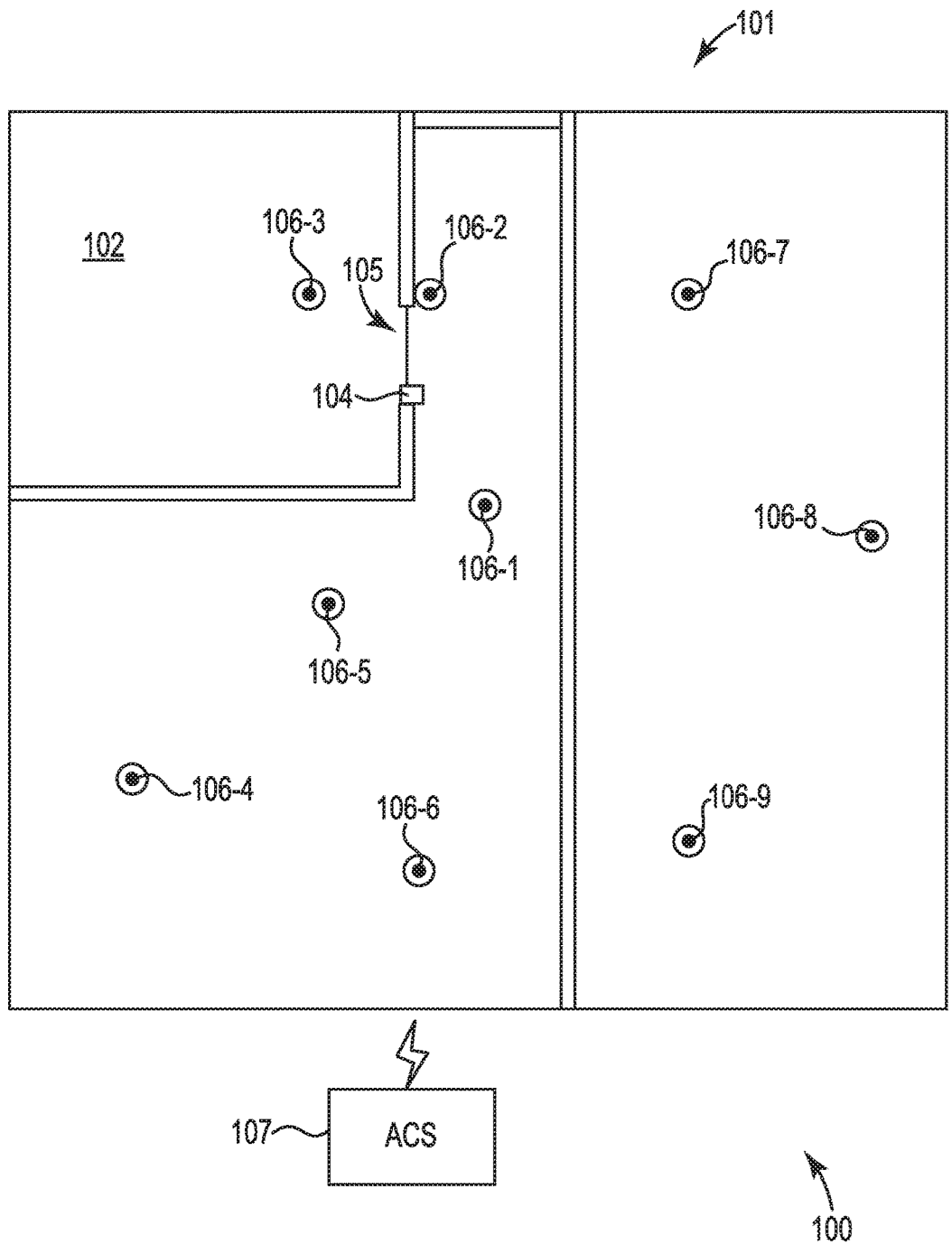
FIG. 1A illustrates a system for access control via a mobile device in accordance with one or more embodiments of the present disclosure.

Access control via a mobile device is described herein. For example, one or more embodiments include a computer-readable medium having instructions stored thereon executable by a processor to track a location of a mobile device in a facility based on communications between the mobile device and a plurality of beacons located in the facility, wherein the mobile device is associated with a particular user having access rights associated with the facility, determine that the mobile device is located in a particular area of the facility, determine whether the user is allowed access to the particular area based on the access rights, and provide a notification responsive to a determination that the user is not allowed access to the particular area.

Embodiments of the present disclosure can effectively replace a user-carried physical access card and access control system hardware devices with a mobile device. By using a mobile device—something most users typically already carry—embodiments of the present disclosure can provide increased security while streamlining user interaction with the access controls system. Additionally, embodiments herein can reduce costs by obviating the need for expensive hardware devices to verify user identities.

Increased security can be provided through capabilities offered by mobile devices. In some embodiments, users (i.e., the user's mobile device) can be assigned a digital identity (discussed further below). The digital identity can allow the mobile device, instead of a physical hardware access controller, to control access, for instance.

Increased security can be provided by maintaining a connection between a mobile device and a centralized physical security system (herein referred to as "access control system"). User interaction with the access control system can be streamlined via capabilities offered by mobile devices. In some embodiments, global positioning system (GPS), WiFi, and/or other location functionalities provided by the mobile device may allow the automatic determination of user location (e.g., without user input). Thus, rather than physically presenting a card (or other device) for access to an area, the user can simply draw within a particular distance of the area.

That is, whereas previous approaches may utilize "card readers," which typically call for a user to present a card (e.g., badge and/or other token), read the card, then transmit a signal physically to an access controller to make an access determination (e.g., whether the user is allowed access), embodiments of the present disclosure can allow the mobile device itself to effectively become the card. Then, the "card" can be presented to a "reader" by virtue of the mobile device being in a particular physical location (or within a particular distance of a particular physical location).

By tracking the location of a mobile device associated with a user, embodiments of the present disclosure can determine if a user has entered an area to which the user is not allowed access. In some cases, such entry can be the result of "tailgating," for instance. Tailgating refers to a person intentionally or unintentionally following another person through a secured door into an area. Because access is granted only to the first person, previous approaches to access control may not even be aware that the tailgater has entered the area.

Embodiments herein can determine when a person has entered an area to which they are not allowed access by tracking their mobile device. When a person is determined to have entered such an area, one or more actions may be taken. In some embodiments, a notification may be sent to the mobile device. In some embodiments, a notification may be sent to a computing device. In some embodiments, security personnel may be dispatched in order to make contact with the person.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. As used herein, "a" or "a number of" something can refer to one or more such things. For example, "a number of areas" can refer to one or more areas.

FIG. 1A illustrates a system 100 for access control via a mobile device in accordance with one or more embodiments of the present disclosure. As shown in FIG. 1, system 100 a plurality of beacons in a facility 101. Nine beacons are illustrated in FIG. 1A, though it is noted embodiments of the present disclosure are not limited to a particular number of beacons. The beacons include a beacon 106-1, a beacon 106-2, a beacon 106-3, a beacon 106-4, a beacon 106-5, a beacon 106-6, a beacon 106-7, a beacon 106-8, and a beacon 106-9, and are cumulatively referred to herein as "beacons 106."

The beacons 106 can be devices capable of wireless communication with a mobile device. In some embodiments, one or more of the beacons 106 can be associated with (e.g., located proximal to) the relay 104, the door 105, and/or the area 102. For instance, the beacon 106-2 is located proximal to the door 105 (e.g., within 5 feet of the door 105). The beacons 106 can allow the determination of a location of a mobile device in the facility 101. For example, the beacons 106 can allow the determination of whether a mobile device is within a particular (e.g., threshold) distance of the area 102 and/or the door 105. The beacons 106 can communicate with a mobile device via Bluetooth Low Energy (BLE) technology (e.g., as an iBeacon), WiFi, etc. In some embodiments, the beacons 106 can include one or more readable tags (e.g., near field communication (NFC)) tags.

A facility, as used herein, can refer to one or more buildings, businesses, homes, plants, hospitals, refineries, etc. The facility 101 can include indoor and/or outdoor areas. The facility 101 includes an area 102. The area 102 can be a portion of the facility 101. In some embodiments, the area 102 can be a room, a plurality of rooms, a wing, a building, a plurality of buildings, an installation, etc. In some embodiments, the area 102 can be defined by physical boundaries (e.g., walls, doors, etc.). In some embodiments, the area 102 can be defined by logical and/or geographic boundaries. The area 102 can be defined by a user, by a Building Information Model (BIM) associated with the facility 101, and/or by an access control system.

The area 102 may be a restricted area and/or an area requiring access rights for entry. Entry into and/or exit from the area 102 can be made via a door 105. Unlocking of the door may be performed by a relay 104. The relay 104 can be a device allowing remote control that can be actuated by variation in conditions of one or more electric circuits. In some examples, the relay 104 can be a locking device. In some examples, the relay 104 can include one or more actuating mechanisms.

In some embodiments, control of the relay 104 may be provided from a mobile device. In some embodiments, the control may be provided directly from a computing device (e.g., the ACS 107, described below) or via one or more intermediary devices (e.g., a controller) in communication with the relay 104.

Because, as described above, the "card" can be presented to a "reader" by virtue of the mobile device 102 being in a particular physical location (or within a particular distance of a particular physical location), embodiments of the present disclosure can implement the relay 104 in the absence of a controller (e.g., a local controller). That is, in some embodiments, the relay 104 does not include a controller. Various examples herein may refer to the relay 104 being a locking device for a door, but it is to be understood that such examples are not to be taken in a limiting sense; embodiments of the present disclosure do not limit relay 104 to a particular device.

The ACS 107 can be a computing device (e.g., a computing device having a processor and a memory, described below in connection with FIG. 2). The ACS 107 can control (e.g., manage) access to a number of areas (e.g., the area 102) of the facility 101. Though in the example illustrated in FIG. 1 the ACS 107 is shown external to the facility 101 (e.g., remote with respect to the facility 101), embodiments of the present disclosure are not so limited. In some embodiments, the ACS 107 is internal to the facility 101 (e.g., local with respect to the facility 101). In some embodiments, the ACS 107 can be cloud-based. In some embodiments, the ACS 107 can manage access to one or more areas across a plurality of facilities.

Figure 1B:
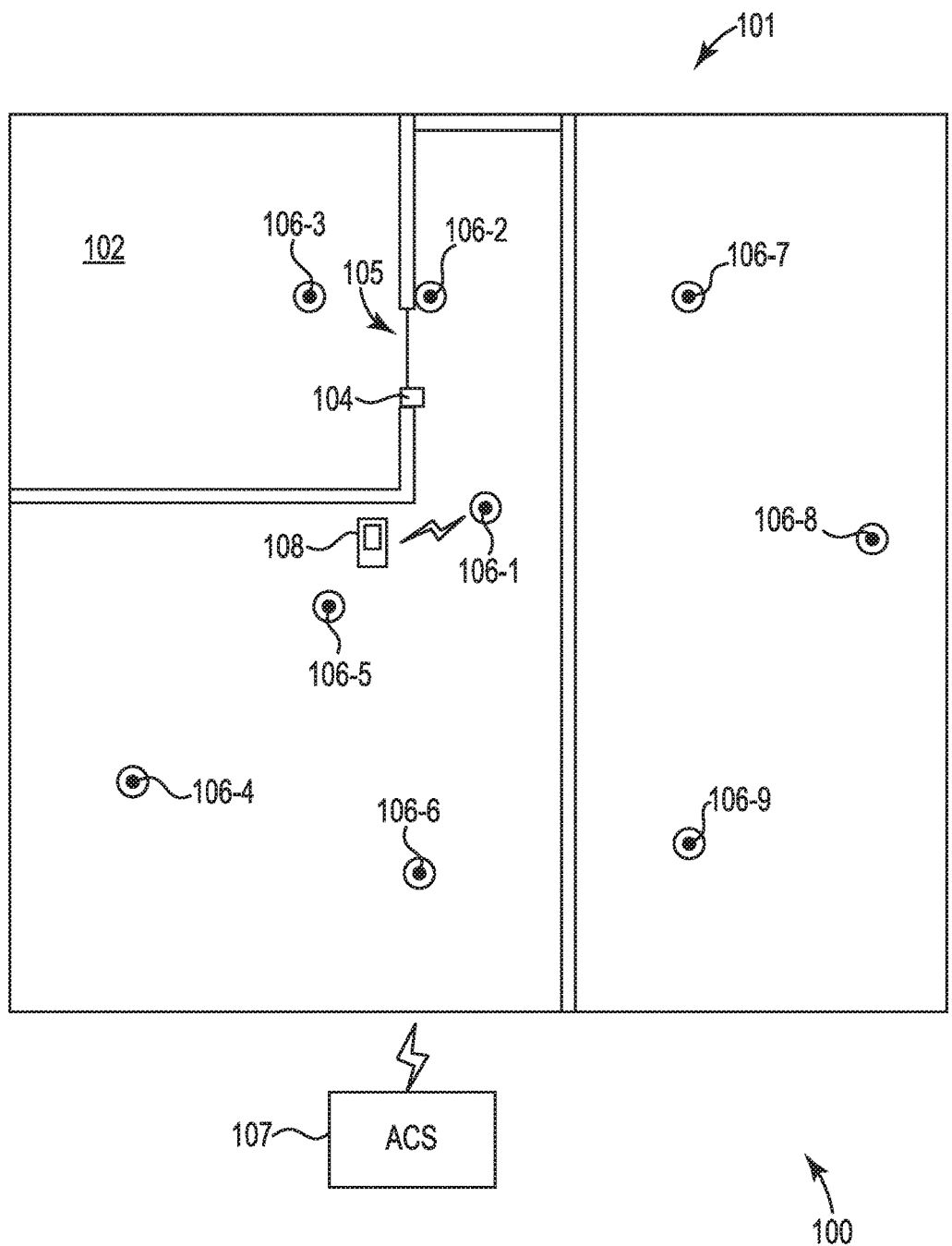
FIG. 1B illustrates the system for access control via a mobile device wherein a mobile device is located at a first location in accordance with one or more embodiments of the present disclosure.

FIG. 1B illustrates the system 100 for access control via a mobile device wherein a mobile device 108 is located at a first location in accordance with one or more embodiments of the present disclosure. The mobile device 108 can be a client device carried or worn by a user. For example, the mobile device 108 can be a phone (e.g., smart phone), personal digital assistant (PDA), tablet, and/or wearable device (e.g., wristband, watch, necklace, etc.).

The mobile device 108 can include one or more software applications (e.g., apps) which can define and/or control communications between the mobile device 108, the ACS 107, and/or other devices. Apps may be received by the mobile device 108 from the ACS 107, for instance. Apps may be launched by a user and/or responsive to some other condition (e.g., the interaction between the mobile device 108 and a beacon (discussed below)). In some embodiments, apps can be executing as background apps. Apps may be and/or include a digital identity, discussed further below.

The mobile device 102 can communicate with (e.g., exchange data with) the ACS 107 via a wired and/or wireless connection, for instance. In some embodiments, the mobile device 108 can communicate using one or more communications modules (e.g., cellular, WiFi, etc.). The ACS 107 can communicate with the relay 104 via a wired and/or wireless connection, for instance. Communication between various devices herein can be carried out over a wireless network. A wireless network, as used herein, can include WiFi, Bluetooth, or any other suitable means to wirelessly transmit and/or receive information.

The mobile device 108 can include a location functionality configured to determine a location of the mobile device. In some embodiments, the location functionality includes a GPS and/or WiFi functionality of the mobile device 108, though embodiments of the present disclosure are not so limited. For example, the mobile device 108 can include an imaging functionality (e.g., a camera) which can be used to read a code at a particular (e.g., known) location in the facility 101. In some embodiments, the mobile device 108 can utilize visual light communication (VLC) techniques to determine its position in the facility 101.

Embodiments of the present disclosure can track a location of the mobile device 108 in the facility 101. As discussed further below, the mobile device 108 can be associated with a particular user having access rights associated with the facility 101. In some embodiments, the user may have access to some portions of the facility but not other portions (e.g., the area 102). In some embodiments, tracking the location can include receiving location information by the ACS 107. The location information can be provided as a particular geographic location (e.g., latitude/longitude) and/or a location with respect to another location, such as an area of a facility 101 or one or more of the beacons 106 of the facility 101. In some embodiments, location information can be communicated from the mobile device 108, and thus received by the ACS 107, responsive to a communication being established between the mobile device 108 and one or more of the beacons 106. In some embodiments, an indication that the mobile device 108 is within a particular distance of the area 102 can be received (e.g., as a request for access to the area 102).

Embodiments of the present disclosure can determine that the mobile device 108 is located in the particular area 102 (e.g., based on a communication being established between the mobile device 108 and the beacon 106-3, for instance. A determination can be made regarding whether the user associated with the mobile device 108 is allowed access to the area 102 based on access rights associated with the user.

In some embodiments, the determination of whether the user of the mobile device 108 is allowed access to the area 102 can be made by the mobile device 108. In some embodiments, the determination of whether the user is allowed access to the area 102 can be made by the ACS 107.

As discussed herein, the determination of whether the user of the mobile device 108 is allowed access to the area 102 can be made by the mobile device 108. Accordingly, access control (i.e., the determination of whether to grant access) can be moved from a controller (or other hardware device(s) seen in previous approaches) to the mobile device 108 itself. Accordingly, where access control is implemented on a mobile device in accordance with embodiments of the present disclosure, facilities need not employ complex physical access controllers capable of managing access only to a limited number of access points (e.g., doors) as in previous approaches. Instead, a remote and/or virtual (e.g., cloud-based) controller can be implemented, for instance, in conjunction with one or more relays (such as those previously discussed).

Determining whether the user is allowed access to the area can include determining whether the user (via the mobile device 108) has been provided with (or otherwise received) a digital identity. A digital identity can correspond to the physical identity of the user. The digital identity can be unique to the mobile device 108 of the user (e.g., one digital identity per mobile device of the user). The digital identity can be (or be a portion of) an app, for instance (e.g., executable instructions stored on a computer-readable medium).

In some embodiments, the digital identity can be a permanent digital identity. A permanent digital identity can be a digital identity that does not expire. For example, a permanent digital identity can be sent to the mobile device of a user who is an employee that works in the facility. The employee can utilize the permanent digital identity until the employee is no longer employed at the facility.

In some embodiments, the digital identity can be a temporary digital identity. A temporary digital identity can be a digital identity that expires after a set period of time. For example, a temporary digital identity can be sent to the mobile device of a user who is a visitor or guest at the facility. After the set period of time, the visitor/guest's temporary digital identity can expire, and the visitor/guest can lose access to the building (or to particular areas of the building). In some embodiments, the digital identity can be shared with a building management system. The building management system can allow management (e.g., monitoring and/or control) of the facility.

Thus, determining whether the user of the mobile device 108 is allowed access to the area 102 can include determining whether the user is allowed access at the particular time that the user is in proximity to the area 102. The time can refer to the time of a day and/or the day of a week, for instance, though embodiments of the present disclosure are not so limited.

A digital identity can be associated with (e.g., assigned) access rights. Access rights assigned to a digital identity can vary from one user to another. Access rights, as used herein, can include information describing a user's ability to access different areas of the facility 101. For example, a supervisory employee may be able to access more areas of a facility than a lower level employee.

In some embodiments, the access rights can be preconfigured access rights. For example, lower level employees can be given an access level that grants an employee access to lower security areas of a facility, whereas higher level employees can be given an access level that allows those higher level employees access to areas with higher security restrictions. As an additional example, access levels can be preconfigured based on the position the employee holds (e.g., a secretary can receive a different access level than a building technician).

In some embodiments, the access rights can be customized access rights. Customized access rights can include access rights that are customized for an individual user. For example, a user can receive access to areas A, B, C, and E, but not area D. As another example, a user can receive access to a number of areas of a building that do not fall within a preconfigured access level.

In some embodiments, a digital identity may expire after a particular period of time (e.g., one day). In some embodiments, a digital identity may expire based on a location of the mobile device 108. For example, a digital identity may expire when a user visiting the facility 101 exits the facility 101. As the digital identity expires, so too can the access rights associated with it.

Some embodiments calling for enhanced security can verify that the mobile device 108 to which the digital identity has been provided is indeed possessed by the correct user (e.g., the user allowed access). For example, the user can be authenticated to the mobile device 108. Such authentication can be carried out responsive to a prompt issued by the mobile device 108. In some embodiments, authenticating the user to the mobile device 108 can include receiving one or more inputs made by the user. In some embodiments, input(s) can include PINs, codes, patterns, etc. In some embodiments, inputs can include one or more biometric inputs. A biometric input can include a fingerprint scan, a facial scan, etc., though it is to be understood that embodiments of the present disclosure are not limited to particular biometric input(s).

Embodiments of the present disclosure can provide a notification responsive to a determination that the user is not allowed access to the particular area 102. In some embodiments, a notification can be provided to the mobile device 108. Such a notification may read "you have entered a restricted area, please turn around," for instance. In some embodiments, a notification can be provided to a computing device associated with a security system of the facility. The computing device can be the ACS 107 in some embodiments. Once received, such a notification may prompt (or cause) the dispatch of security personnel to make contact with the carrier of the mobile device 108.

Notifications can be provided in accordance with embodiments herein for other reasons. For instance, a notification can be provided to the computing device associated with the security system of the facility 101 responsive to a determination that a location functionality of the mobile device 108 is deactivated. The location functionality may include the functionality allowing the mobile device to communicate with the beacons 106, for instance, (e.g., Bluetooth, WiFi, etc.). In some embodiments, a notification can be provided to the ACS 107 responsive to a loss of a communication between the ACS 107 and the mobile device 108 (e.g., because of a deactivation of a communication functionality of the mobile device 108). In some embodiments, a notification can be provided to the ACS 107 responsive to a determination that the mobile device 108 did not establish a communication with one or more of the beacons 106 associated with the door 105 before entering the area 102. In some embodiments, a notification can be provided to the ACS 107 responsive to a determination that the mobile device was purposely (e.g., due to power off) or accidentally (e.g., due to expiration of battery) deactivated. In such cases, occupancy of the user in the area 102 can be determined using one or more devices of the facility other than the beacons 106. Such devices can include, for example, infrared counting beams, occupancy detectors, cameras, etc.

In some embodiments, controlled access to the area 102 can involve the utilization of a "virtual turnstile" in which the mobile device 108 is determined to have gone in through the door 105 and out through the door 105 to arrive in the area 102. In such embodiments, a subset (e.g., three) of the beacons 106 may be used. For example, a communication established between the mobile device 108 and a first beacon 106-1 can indicate that the user carrying the mobile device 108 potentially intends to enter the area 102 via the door 105. Such a communication is illustrated in FIG. 1B. A second communication can be established between the mobile device 108 and a second beacon 106-2 as the user approaches the door 105. Such a communication is illustrated in FIG. 1C.

Figure 1C:
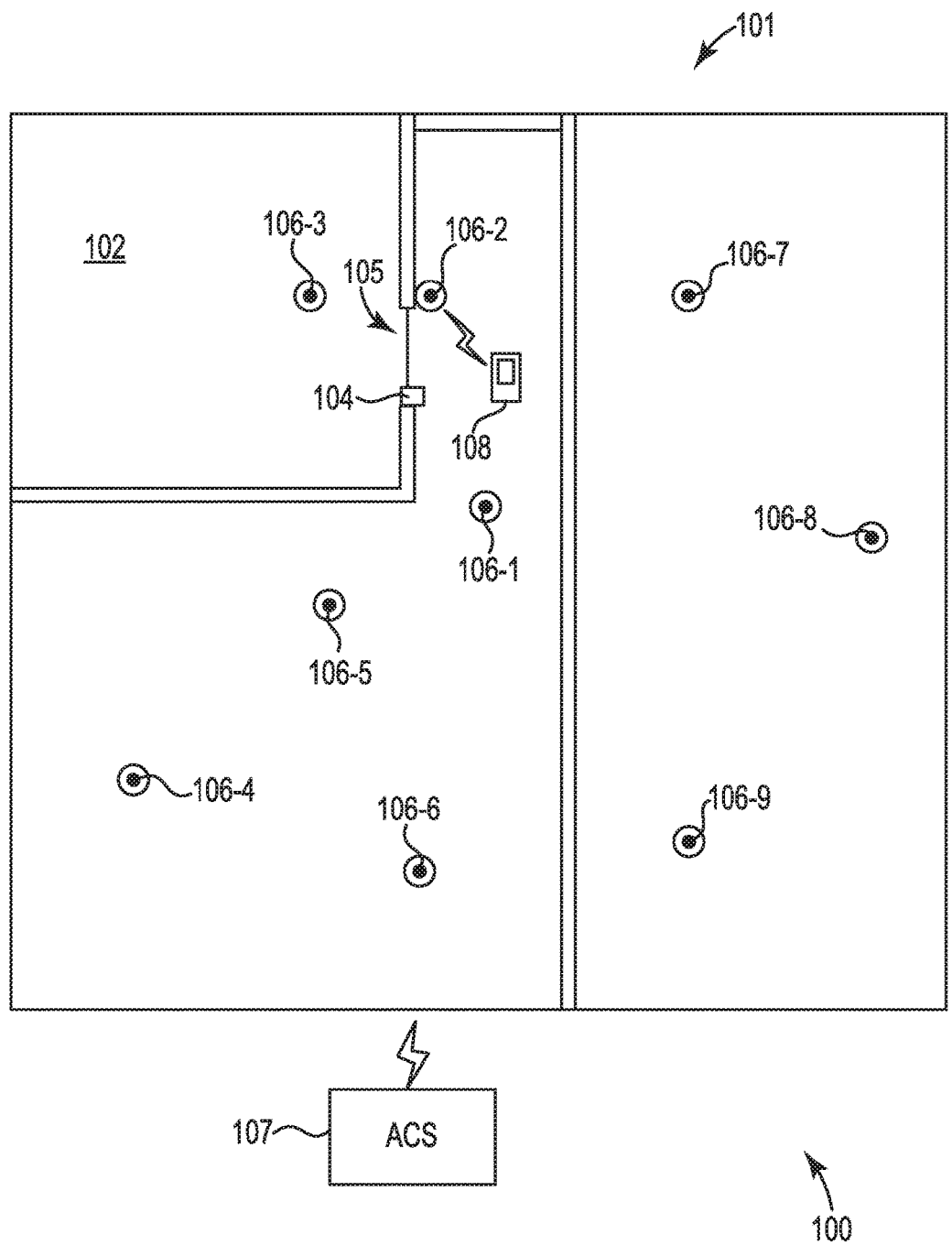
FIG. 1C illustrates the system for access control via a mobile device wherein the mobile device is located at a second location in accordance with one or more embodiments of the present disclosure.

FIG. 1C illustrates the system 100 for access control via a mobile device wherein the mobile device 108 is located at a second location in accordance with one or more embodiments of the present disclosure. As shown, the second location is closer to the door 105 than the first location (the distance from the first location to the door exceeds the distance from the second location to the door). Subsequent to the first communication between the mobile device 108 and the first beacon 106-1, a communication established between the beacon 106-2 indicates that the user is approaching the door 105 with the intent to enter the area 102. If the user is determined to be allowed access to the area 102, the mobile device 108 and/or the ACS 107 can transmit a signal (e.g., a control signal) to the relay 104 associated with the area 102 to allow access. In an example, the relay 104 can be responsible for physically locking the door 105 to the area 102 and the signal causes the relay 104 to change from a locked mode to an unlocked mode. Thus, the relay 104 can grant the user access to the area 102 responsive to a determination by the mobile device 108 and/or the ACS 107 that the user is allowed access.

Figure 1D:
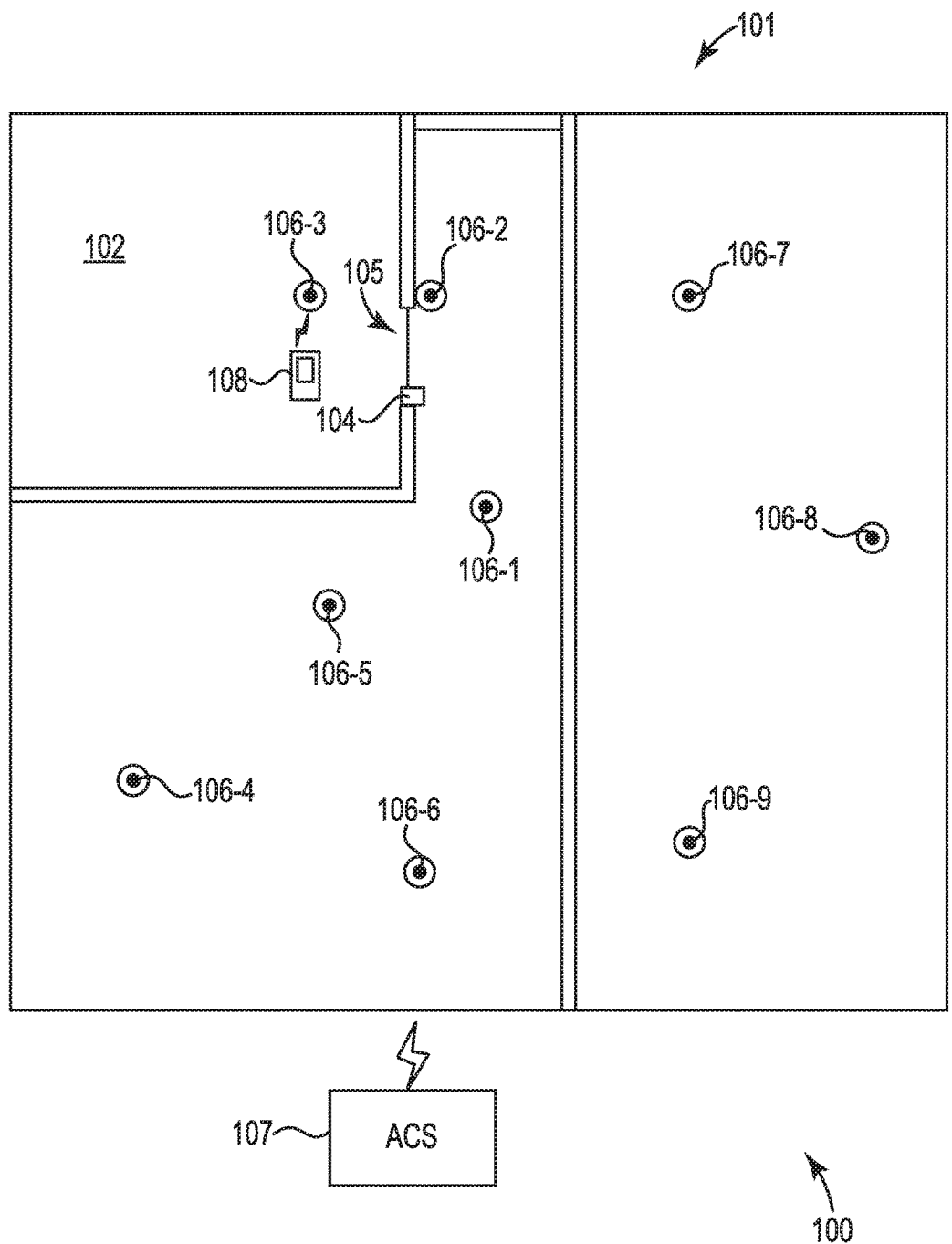
FIG. 1D illustrates the system for access control via a mobile device wherein the mobile device is located at a third location in accordance with one or more embodiments of the present disclosure.

FIG. 1D illustrates the system 100 for access control via a mobile device wherein the mobile device 108 is located at a third location in accordance with one or more embodiments of the present disclosure. Once inside the area 102, the mobile device 102 can establish a communication with a third beacon 106-3 interior to the area 102 thereby apprising the ACS 107 that the user has indeed entered and is now occupying the area 102. In some embodiments, the mobile device 108 is determined to be located in the area responsive to the first communication, the second communication, and the third communication, in that order.

In some embodiments, the relay 104 can be configured to deny the user access to the area 102 responsive to a failure of communication between the mobile device 108 and the first beacon 106-1, a failure of communication between the mobile device 108 and the second beacon 106-2, or a determination by the mobile device 108 that the user is not allowed access to the area 102 based on the digital identity. When the user leaves the area 102, the process can be reversed. For instance, a fourth communication between the mobile device 108 and the third beacon 106-3 can be established subsequent to the third communication (which was also between the mobile device 108 and the third beacon 106-3). A fifth communication between the mobile device 108 and the second beacon 106-2 can be established subsequent to the fourth communication, and a sixth communication between the mobile device 108 and the first beacon 106-1 can be established subsequent to the fifth communication.

Figure 2:
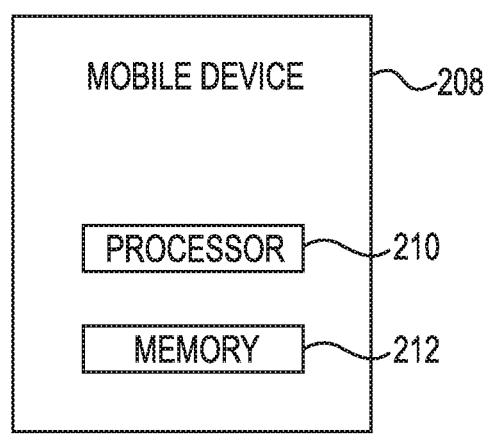
FIG. 2 illustrates a mobile device in accordance with one or more embodiments of the present disclosure.

FIG. 2 illustrates a mobile device 208 in accordance with one or more embodiments of the present disclosure. The mobile device 208 can be a computing device. The mobile device 208 can include a memory 212 and a processor 210 configured to execute executable instructions stored in the memory 212 to perform various examples of the present disclosure, for example. That is, the memory 212 can be any type of non-transitory storage medium that can be accessed by the processor 210 to perform various examples of the present disclosure. For example, the memory 212 can be a non-transitory computer readable medium having computer readable instructions (e.g., computer program instructions) stored thereon that are executable by the processor 210.

The memory 212 can be volatile or nonvolatile memory. The memory 212 can also be removable (e.g., portable) memory, or non-removable (e.g., internal) memory. For example, the memory 212 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 212 is illustrated as being located within the mobile device 102, embodiments of the present disclosure are not so limited. For example, memory 212 can also be located internal to another computing resource (e.g., enabling computer readable instructions to be downloaded over the Internet or another wired or wireless connection). In some embodiments, the memory 212 and/or the processor 210 can be located in the ACS 107.

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer-readable medium having instructions stored thereon executable by a processor to:
   track a location of a mobile device in a facility based on communications between the mobile device and a plurality of beacons located in the facility, wherein the mobile device is associated with a particular user having access rights associated with the facility;
   determine that the mobile device is located in a particular area of the facility;
   determine whether the user is allowed access to the particular area based on the access rights;
   provide a first notification responsive to a determination that the user is not allowed access to the particular area;
   provide a second notification to a computing device associated with a security system of the facility responsive to a determination that the mobile device did not establish a communication with at least one of the plurality of beacons associated with a door to the particular area of the facility before entering the particular area; and
   provide a third notification to the computing device associated with the security system of the facility responsive to a determination that a location functionality of the mobile device was purposely deactivated by a user.

2. The medium of claim 1, wherein the instructions include instructions to provide the first notification, the second notification, and the third notification to the mobile device.

3. The medium of claim 1, wherein instructions include instructions to provide the first notification, the second notification, and the third notification to the computing device associated with the security system of the facility.

4. The medium of claim 1, wherein the instructions include instructions to provide a fourth notification to the computing device associated with the security system of the facility responsive to a loss of a communication between the computing device associated with the security system and the mobile device.

5. The medium of claim 1, wherein the instructions to determine that the mobile device is located in a particular area of the facility include instruction to determine that the mobile device is located in the particular area of the facility based on a communication between the mobile device and one of the plurality of beacons located in the particular area.

6. The medium of claim 1, wherein the plurality of beacons includes:
   a first beacon exterior to the particular area of the facility located a first distance from the door to the particular area;
   a second beacon exterior to the particular area of the facility located a second distance from the door to the particular area, wherein the first distance exceeds the second distance; and
   a third beacon interior to the particular area of the facility; and
   wherein the instructions include instructions to track the mobile device based on communications between the mobile device and the first beacon, the second beacon, and the third beacon.

7. The medium of claim 6, wherein the instructions include instructions to determine that the mobile device is located in the particular area responsive to:
   a first communication between the mobile device and the first beacon;
   a second a communication between the mobile device and the second beacon subsequent to the first communication; and
   a third communication between the mobile device and the third beacon subsequent to the second communication.

8. A system for providing access control via a mobile device, comprising:
   an access control system configured to:
      determine an area of a facility to which a user is authorized access; and
      provide a digital identity configured to allow the user access to the area;
   a first beacon exterior to the area of the facility located a first distance from a door to the area;
   a second beacon exterior to the area of the facility located a second distance from the door to the area, wherein the first distance exceeds the second distance; and
   a third beacon interior to the area of the facility;
   a mobile device associated with the user and configured to:
      receive the digital identity; and
      communicate with the first beacon, the second beacon, and the third beacon; and
   a relay configured to deny the user access to the area of the facility responsive to:
      a failure of communication between the mobile device and the first beacon, and a failure of communication between the mobile device and the second beacon, wherein the access control system is configured to determine that the mobile device is located in the area of the facility responsive to a communication between the mobile device and the first beacon followed by a communication between the mobile device and the second beacon followed by a communication between the mobile device and the third beacon.

9. The system of claim 8, wherein the mobile device is a smart phone.

10. The system of claim 8, wherein the mobile device is a wearable device.

11. The system of claim 8, wherein the first, second, and third beacons are Bluetooth low energy beacons.

12. The system of claim 8, wherein the system includes a relay configured to grant the user access to the area of the facility responsive to:
   the communication between the mobile device and the first beacon;
   the communication between the mobile device and the second beacon; and
   a determination by the mobile device that the user is allowed access to the area based on the digital identity.

13. The system of claim 8, wherein the relay is configured to deny the user access to the area of the facility responsive to a determination by the mobile device that the user is not allowed access to the area based on the digital identity.

14. The system of claim 8, wherein the access control system is configured to determine that the user has entered the particular area responsive to:
   the communication between the mobile device and the first beacon;
   the communication between the mobile device and the second beacon; and
   the communication between the mobile device and the third beacon.

15. The system of claim 14, wherein the access control system is configured to determine that the user has exited the particular area responsive to:
   a fourth communication between the mobile device and the third beacon subsequent to the third communication;
   a fifth communication between the mobile device and the second beacon subsequent to the fourth communication; and
   a sixth communication between the mobile device and the first beacon subsequent to the fifth communication.

16. A method for providing access control via a mobile device, comprising:
   tracking a location of a mobile device in a facility using a plurality of wireless beacons in the facility, wherein the mobile device includes a digital identity corresponding to a particular user having access rights associated with the facility;
   determining that the mobile device is located in a particular area of the facility;
   determining whether the user is allowed access to the particular area based on the digital identity;
   providing a first notification responsive to:
      a determination that the user is not allowed access to the particular area; and
      a determination that the mobile device did not establish a communication with a wireless beacon associated with a door to the particular area before entering the particular area;
   providing a second notification responsive to:
      a determination that the user is not allowed access to the particular area; and
      a determination that a communication functionality of the mobile device is deactivated; and,
   providing a third notification responsive to:
      a determination that the user is not allowed access to the particular area; and
      a determination that the mobile device was purposely deactivated.

17. The method of claim 16, wherein the method includes determining that the mobile device is located in the particular area based on a communication between the mobile device and a wireless beacon in the particular area.

18. The method of claim 16, wherein the method includes determining the mobile device is located in the particular area based on information received from a device of the facility other than the plurality of wireless beacons.

* * * * *